INVENTOR.
WILLIAM J. BRUNT

April 5, 1949. W. J. BRUNT 2,466,079
FAULT LOCATOR COIL
Filed Oct. 3, 1945 2 Sheets-Sheet 2
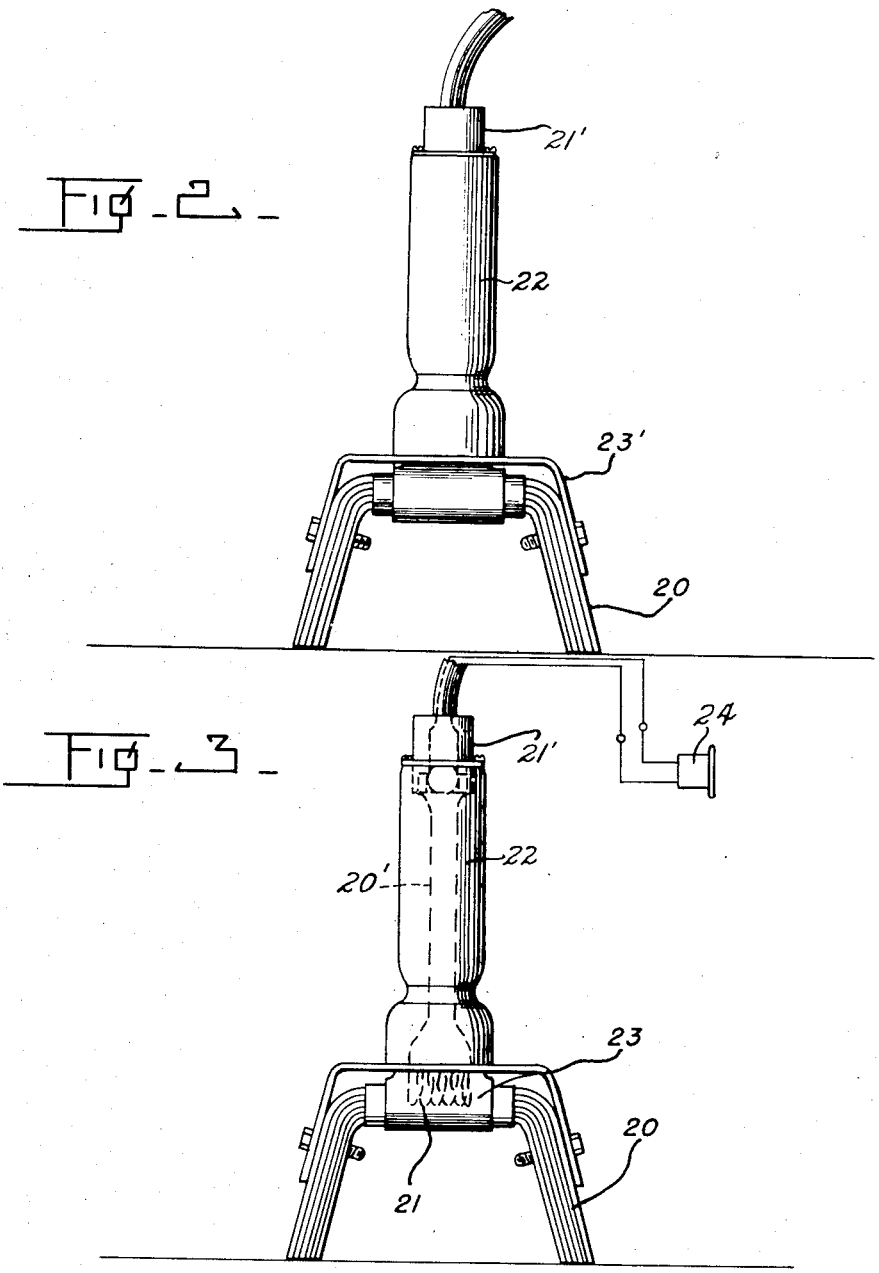
INVENTOR.
WILLIAM J. BRUNT
BY *Victor J. Evans & Co.*
ATTORNEYS Patented Apr. 5, 1949

2,466,079

UNITED STATES PATENT OFFICE 2,466,079

FAULT LOCATOR COIL

William J. Brunt, Rahway, N. J.

Application October 3, 1945, Serial No. 620,093

1 Claim. (Cl. 175—183)

The invention relates to a testing system for locating accidental grounds on energized electrical power lines or the like, and more especially to a ground detector and signal apparatus for faulty power lines or the like.

The primary object of the invention is the provision of a system of this character, wherein it can be used on any power line, of any voltage or of any phase, so that a fault therein can be located without any shutdown of equipment, and is especially designed for factory service.

Another object of the invention is the provision of a system of this character, wherein there can be located accidental grounds in an electric power line and also it will reveal if the electrical conduits are properly bonded and grounded, the system being portable, sensitive and reliable in action for locating line troubles and faults.

A further object of the invention is the provision of a system of this character, which is simple in construction, thoroughly reliable and efficient in operation, conveniently handled, durable, and inexpensive to manufacture and set up.

With these and other objects in view, the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 2 is an elevation of the signal pick-up instrument for use with the system of Figure 1 for fault-finding purposes;

Figure 3 is a view similar to Figure 2 but showing by dotted lines the winding of the pick-up coil and its connection with receiver plug coupling.

Similar reference characters indicate corresponding parts throughout the several views in the drawings.

Figure 1:
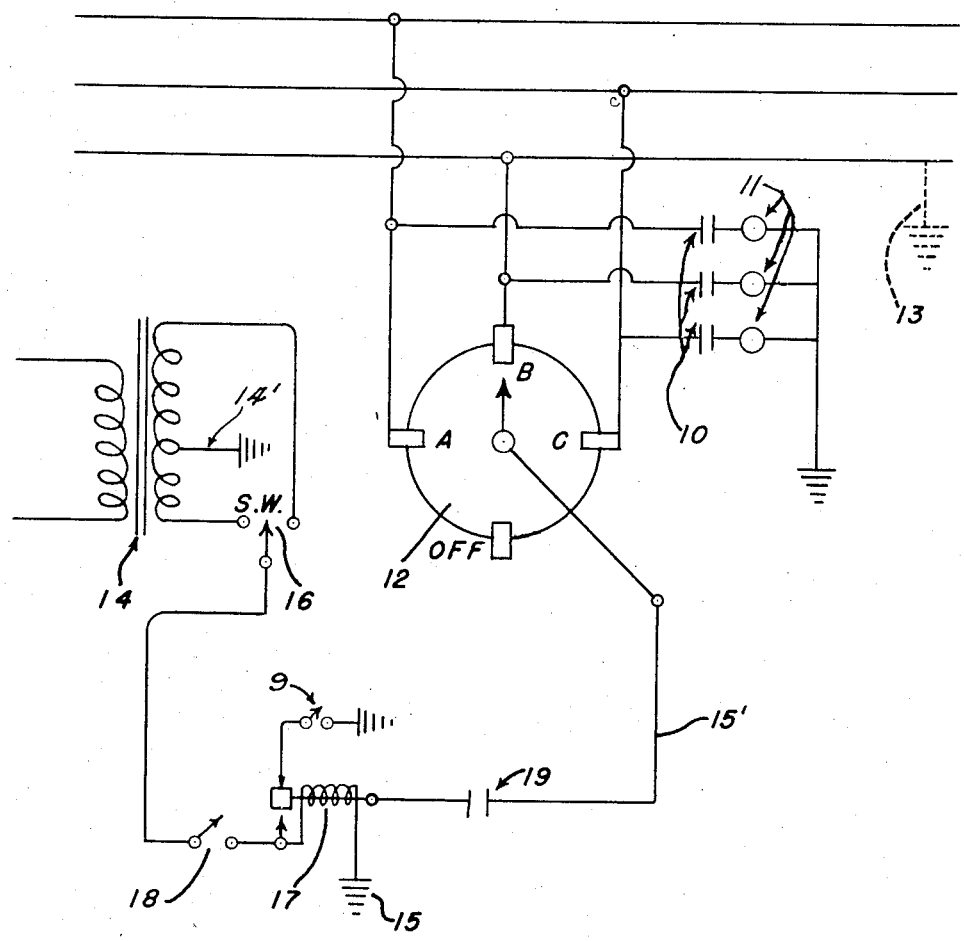
Figure 1 is a schematic view of a signal generating system constructed in accordance with the invention and installed on a three-phase power line.

Referring to the drawings in detail, the system constituting part of the present invention is, as schematically shown in Figure 1, always connected to the power line, in this instance, shown as a three-phase set-up, and is effective for use with a detector for indicating continuously any accidental grounds in such line. In the case of a three-phase set-up, this signal generator has three condensers 10 of suitable size, such as ¼ mfd. condensers for 480 volt power lines, and three pilot lamps 11 of proper wattage; ½ mfd. condensers are employed for use with 240 volt power lines. A selector switch 12 connects the generated signal to the proper phase line to determine whether it is accidentally grounded; 13 representing an accidental short to ground.

A power transformer 14 supplies energy through a double throw, single pole switch 16 and thence through an on-and-off switch 18 to a magnetic interrupter 17, which generates a signal at audible frequencies. The secondary winding of the transformer 14 is tapped and grounded whereby the switch 16 may be connected to two different voltages for obtaining audible signals of different strengths. The audible frequency signal is fed to the selector switch 12 through conductor 15' and a condenser 19 of suitable capacity. This signal is detected by the unit of Figures 2 and 3. A telephone receiver 24 is connected through a conventional male and female plug 21' and by the leads 20' to a winding 21 about a U-shaped laminated iron core 20. The winding 21 of the instrument is shielded as at 23 to prevent A.-C. hum from drowning out the signal through the receiver. A substantially channel-shaped bar 23' having divergent leg portions depending from a flat bar portion, retains the iron core to the holder 22 as shown in Figure 3.

The system as before described is a tone test method of locating accidental grounds in energized power lines. The tone generating means is connected to the power lines and the detector unit of Figures 2 and 3 are carried by a trouble man along the route of the suspected conductor and is as close as possible to this conductor. The tone signal will be heard between the point of connection of the tone generating device and the grounded portion of the line thereby identifying the trouble point in the power line for correction by the lineman.

What is claimed is:

A detector unit adapted to be moved along the path of an electrical power line in inductive relationship therewith for detecting an audio frequency signal impressed upon the power line, said unit comprising an elongated holder adapted to be manually held, a flat bar portion secured in the plane of and to one end of said holder, divergent leg portions depending from the ends of said flat bar portion, a metallic substantially U-shaped laminated pick-up core located in the plane of and extending between said leg portions parallel thereto and adapted to be placed adjacent the power line, means securing said leg portions to said core, a winding about said pick-up core, a casing about said winding and secured to said holder, an earphone and electrical means connecting said winding with said earphone whereby the audio frequency signal impressed upon the power line is converted to an audible signal.

WILLIAM J. BRUNT.

REFERENCES CITED

The following references are of record in the file of this patent:

UNITED STATES PATENTS

| Number | Name | Date |
|---|---|---|
| 761,280 | Woodbridge | May 31, 1904 |
| 1,254,288 | Stewart | Jan. 22, 1918 |
| 1,412,376 | Stoller | Apr. 11, 1922 |
| 1,523,398 | Ceccarini | Jan. 20, 1925 |
| 1,724,973 | Shann | Aug. 20, 1929 |
| 2,306,783 | Hall | Dec. 29, 1942 |

FOREIGN PATENTS

| Number | Country | Date |
|---|---|---|
| 23,852 | Great Britain | Sept. 14, 1901 |